United States Patent
Spirito et al.

(10) Patent No.: US 7,398,052 B2
(45) Date of Patent: Jul. 8, 2008

(54) METHOD AND A SYSTEM FOR DETECTING COMMUNICATION RELAYING NETWORK ELEMENTS

(75) Inventors: Maurizio Spirito, Turin (IT); Mikko Weckström, Helsinki (FI); Ville Ruutu, Espoo (FI)

(73) Assignee: Spyder Navigations L.L.C., Wilmington, DE (US)

( * ) Notice: Subject to any disclaimer, the term of this patent is extended or adjusted under 35 U.S.C. 154(b) by 213 days.

(21) Appl. No.: 10/494,274

(22) PCT Filed: Oct. 30, 2002

(86) PCT No.: PCT/IB02/04590

§ 371 (c)(1),
(2), (4) Date: Jun. 22, 2004

(87) PCT Pub. No.: WO03/039037

PCT Pub. Date: May 8, 2003

(65) Prior Publication Data

US 2005/0054312 A1    Mar. 10, 2005

(30) Foreign Application Priority Data

Nov. 1, 2001    (GB) .................................. 0126267.4

(51) Int. Cl.
*H04B 7/14*    (2006.01)
*H04B 1/60*    (2006.01)
*H04B 17/02*    (2006.01)
*H04B 17/00*    (2006.01)

(52) U.S. Cl. .................... 455/18; 455/9; 455/67.11; 455/67.16

(58) Field of Classification Search ................. 455/424, 455/524, 67.11, 67.14, 67.16, 226.1, 9, 18
See application file for complete search history.

(56) References Cited

U.S. PATENT DOCUMENTS

| | | | |
|---|---|---|---|
| 5,910,943 A | 6/1999 | Wickman | |
| 6,141,406 A * | 10/2000 | Johnson | ....................... 379/189 |
| 6,192,247 B1 * | 2/2001 | Dillon et al. | ................. 455/446 |
| 7,031,722 B2 * | 4/2006 | Naghian | ................... 455/456.1 |
| 2002/0160798 A1 * | 10/2002 | Shoji et al. | .................... 455/522 |
| 2003/0083008 A1 * | 5/2003 | Baker et al. | .................... 455/17 |
| 2004/0132443 A1 * | 7/2004 | Klein et al. | ................. 455/424 |
| 2005/0124374 A1 * | 6/2005 | Riley et al. | ................. 455/525 |

FOREIGN PATENT DOCUMENTS

| | | |
|---|---|---|
| GB | 2 346 511 A | 8/2000 |
| WO | WO 00/14906 | 3/2000 |

* cited by examiner

*Primary Examiner*—Nay Maung
*Assistant Examiner*—Andrew Wendell (57) ABSTRACT

A method for determining if a signal received at a radio receiver in a communication system is transmitted to the receiver via a direct radio link comprising the steps of: determining a signal characteristic based on one or more signal measurements collected at the receiver; comparing the signal characteristic as determined with at least one predetermined system parameter; and responsive to said comparison determining if said signal is received via a direct link.

20 Claims, 6 Drawing Sheets

METHOD AND A SYSTEM FOR DETECTING COMMUNICATION RELAYING NETWORK ELEMENTS

CROSS-REFERENCE TO RELATED APPLICATIONS

This application is a National Phase of International Application No. PCT/JB2002/04590 filed on Oct. 30, 2002. the entire disclosure of which is incorporated herein by reference, which claims the benefit of Great Britain Patent Application No. 0126267.4 that was filed Nov. 1, 2001, the entire disclosure of which is incorporated herein by reference.

The present invention relates to a method and apparatus for determining if a signal received by a mobile user equipment in a communication system is transmitted via a direct or indirect communication link. In particular, but not exclusively, the method and apparatus can be utilized to enable location services in the communication system to accurately locate the mobile user equipment.

Various user equipment (UE) such as computers (fixed or portable), mobile telephones, personal data assistants or organisers and so on are known to the skilled person and these can be used to communicate with other user equipment in a communication system or to access the Internet to obtain services. Mobile user equipment is often referred to as a mobile station (MS) and can be defined as a means which is capable of communication via a wireless interface with a another device such as a base station of a mobile telecommunication network or any other station. Such a mobile user equipment can be adapted for voice, text message or data communication via the wireless interface.

It is well known by the skilled person that it is useful to identify the location of UE. Currently there are many methods via which the geographical location of the UE can be established. Each of these methods has advantages and disadvantages in relation to one another. For example some methods calculate the UE location precisely but take a long time to do so. Other methods are quicker but are less accurate or require more processing power. Many of these location estimating mechanisms are known to be useable with location services (LCS) in communication systems. Some of these are the time of arrival (TOA), enhanced observed time difference (E-OTD), observed time difference of arrival (OTDOA), global positioning system (GPS positioning mechanism), timing advance (TA), strength of signals received by the MS from serving and neighbour cells (RXLEV's)

Through use of at least one of these methods the LCS provides means to locate a UE. The public land mobile network (PLMN) can thus provide a location application with a geographical location of the UE. The location application which uses this information may reside within the PLMN (in either the UE or in the network itself) or outside the PLMN (in an external application). Positioning may be initiated either by the network, the UE or an external application. The various position calculating mechanisms measure various system parameters including power and propagation delays of signals received at the UE.

Because of the intrinsic nature of electromagnetic waves propagation, when a signal propagates through a certain path, its intensity decreases and its propagation time increases with the distance between transmitter and receiver. This effect occurs in mobile communication systems as well as in general. The attenuation experienced by signals transmitted by Base Transceiver Stations (BTSs) and received by mobile UE such as Mobile Stations (MSs) is one of the reasons why, in order to guarantee at the MS side a signal of reliable quality, the service area is covered by installing many BTSs.

Often there is a need to extend the coverage area of a certain cell. It is then possible to connect a repeater to a BTS (which is then termed the donor BTS). The connection between donor BTS and repeater can be implemented through air, optical fibre or any other physical connection. The repeater is installed at a certain distance from the donor BTS (for example at the edge of the cell, where the strength of signals is approximately at the MS sensitivity level) and its basic function is to receive the signal transmitted by the donor BTS, regenerate it (i.e. amplify it) and re-transmit it. Furthermore, the repeater, due to its internal configuration, introduces an additional delay to the signal received from the donor BTS and retransmnitted. Repeaters can also be used instead of BTS's in order to reduce costs.

When a MS receives a signal directly from a certain serving BTS, as the propagation delay increases, the signal's intensity decays. In this sense, propagation delay and intensity of the received signal are both consistent measures of the propagation path's length. On the other hand, the signal received by a MS from a repeater has an intensity higher than the intensity of the same signal if the MS received it directly from the donor BTS. Additionally, due to the repeater's internal delay, the propagation delay of the signal received by the MS is larger than the delay that would affect the same signal, if it was received directly from the serving BTS. The consistency between propagation delay and strength of the signal ceases to exist when the signal is received through a repeater. In fact, there will be an increase of propagation delay (due to the repeater's internal delay) whilst the strength of the received signal is regenerated (increased) by the repeater's amplifier.

The effect of a repeater on propagation delay and signal strength is thus such that as the MS moves further away from the BTS within the BTS coverage area, the average propagation delay increases and the average strength of the signal received from the serving BTS decays. At the border of the BTS coverage area, the signal strength is very low and, if a repeater was not present, the connection should soon be handed over to a new serving cell. When the MS crosses the border between BTS coverage area and repeater coverage area, the signal level increases, thanks to the repeater's amplifier, to levels needed for reliable communications. At the same time, the propagation delay affecting the signal received by the MS increases, due to the repeater's internal delay. When the MS moves further away from the repeater, propagation delay and signal strength behave as in the BTS coverage area but, in absolute terms, they are not anymore representative of the length of the propagation path between donor BTS and MS.

From a communication system operator's point of view, repeaters offer a cost effective solution to many coverage problems. However, repeaters affect negatively other applications such as the LCS application in a communication system. This is because as noted above in LCS applications, the unknown location of a MS is calculated by processing measurements performed on the radio signals exchanged between MS and surrounding BTSs or BTSs and other network elements (Location Measurements Units, (LMU) for example). There are many such known position calculating mechanisms and more are being continually developed. The measurements performed on radio signals include intrinsically the information of where the MS is located with respect to other network elements involved in the measurement process. For example, TA is an estimate of the absolute propagation delay (or equivalently, the absolute distance) between the MS to be located and the serving BTS; RXLEVs can be used to determine the absolute distance (and possibly the orientation) of the MS from the BTSs from which RXLEVs are measured; GTDs measure the relative distance (i.e., difference in absolute distances) between the MS and a pair of BTSs (the serving and one neighbour).

To allow location calculation algorithms to estimate the unknown MS coordinates from a set of measurements (TA, RXLEVs, GTDs etc.) the coordinates of the BTSs involved in the measurement process must be known. The coordinates are obtained by matching BTS identification parameters such as BSIC (Base Station Identity Code), CI (Cell Identity), as well as ARFCN (Absolute Radio Frequency Channel Number), available over the radio interface, with the equivalent parameters stored in an LCS database, and retrieving the corresponding BTS coordinates from the database. If such coordinates are wrong, the MS location estimate is wrong. This happens when, for example, the BTS coordinates in the LCS database are wrong.

The MS location estimate is also wrong when BTS coordinates in the LCS database are correct but the MS performs measurements through a repeater. In fact, BSIC, CI and often ARFCNs are completely transparent to a repeater. As a result, when a MS performs measurements on the signal received through a repeater, it identifies correctly the donor BTS but the measurements, due to the additional delay and amplification introduced by the repeater, are not consistent with the location of the donor BTS retrieved from the LCS database. This results in wrong location estimates.

The negative effects of repeaters on Uplink TOA (Time of Arrival), E-OTD (Enhanced Observed Time Difference) and RIT (Radio Interfaced Timing) measurements, needed for LCS, are mentioned in GSM standards, see for example ETSI, Technical Report "Digital cellular telecommunications system (Phase 2+); Radio network planning aspects (GSM 03.30 version 8.3.0 Release 1999)," doc. ESTI TR 101 362 V8.3.0 (2000-04). One of the solutions to the problem proposed therein is to reject all the measurements when there is a possibility that they are performed on signals received through a repeater. However this is only possible when the MS measures enough BTSs. Moreover in the case of E-OTD, for example, if the repeater is connected to the serving BTS, it affects all the measurements; thus all E-OTD measurements need to be rejected.

Another possibility which has been considered is to reject the measurements only if they are affected by a repeater or, eventually, correct them by compensating the repeater's effects. However in both of these cases, it is necessary to determine whether the signal used to perform measurements is being received by the MS directly from the donor BTS or through a repeater. This has proved to be problematical.

It is an aim of embodiments of the present invention to at least partly mitigate the above mentioned problems.

According to a first aspect of the present invention there is provided a method for determining if a signal received at a radio receiver in a communication system is transmitted to the receiver via a direct radio link comprising the steps of: determining a signal characteristic based on one or more signal measurements collected at the receiver; comparing the signal characteristic as determined with at least one predetermined system parameter; and responsive to said comparison determining if said signal is received via a direct link.

According to a second aspect of the present invention there is provided a method for determining if a signal received at a radio receiver in a communication system is transmitted to the receiver via a direct radio link comprising the steps of: determining at least two different types of signal characteristics based on one or more signal measurement received by the receiver; comparing the determined different types of signal characteristics; and responsive to said comparison determining if said signal is received via a direct link.

According to a third aspect of the present invention there is provided a method for determining if a signal received at a mobile user equipment in a communication system is transmitted to the user equipment via a direct link comprising the steps of: receiving a plurality of signal characteristic measurements each indicating a characteristic of a respective signal received by the user equipment; determining a first value representing the mean of a first characteristic indicated by said plurality of measurements; determining a difference between said first value and a second value representing at least one predetermined system parameter; and responsive to said difference determining if said signal is received via a direct link.

According to a fourth aspect of the present invention there is provided apparatus, arranged to determine if a signal received at a radio receiver in a communication system is transmitted to the receiver via a direct radio link, comprising; means to determine a signal characteristic based on one or signal measurements collected at the receiver; and comparison means for comparing the signal characteristic with at least one predetermined system parameter; whereby said signal is determined to be received via a direct link in response to said comparisons.

According to a fifth aspect of the present invention there is provided apparatus, arranged to determine if a signal received at a mobile user equipment in a communication system is transmitted to the user equipment via a direct link, comprising; means for receiving a plurality of signal characteristic measurements each indicating a characteristic of a respect signal received by the user equipment; means for determining a first value representing the mean of a first characteristic indicated by said plurality of measurements; means for determining a difference between said first value and a second value representing at least one predetermined system parameter; and means responsive to said difference for determining if said signal is received via a direct link.

Embodiments of the present invention provide the advantage that when a repeater is connected to a certain BTS it is possible to determine in certain conditions whether the signal received by a certain MS is coming directly from the serving BTS or through the repeater. This is done by analyzing the consistency between propagation delay and intensity of the signal received by the MS.

According to certain embodiments a set of propagation delay and power of received signal observations are collected. These sets of measurements are used to calculate an estimate of the average propagation delay and/or average received power. By combining the estimated average propagation delay and average received power, a decision can be taken on whether the signal on which the measurements have been performed is received by the MS directly from the donor BTS or not. The decision is taken by exploiting the discontinuity generated by the repeater and the consequent lack of consistency between propagation delay and received strength of the signal received through a repeater. The method may be implemented by using classical hypothesis testing techniques.

A statistical approach, such as the one proposed herein is advantageous because it takes into account the random fluctuations affecting in general the radio wave propagation over the mobile channels and in particular the propagation delay and received power observations used to detect the presence of a repeater. In general, the larger the set of observations is, the more reliable the detection process outcome is.

Embodiments of the present invention also have the advantage that they rely only on propagation delay and signal strength measurements. Such measurements have been made available in the GSM standards to ensure reliable and efficient communications. In GSM, the parameter Timing Advance (TA) is defined to compensate the propagation delay effects on the TDMA access scheme. The TA is an estimate of the round trip MS to serving BTS propagation delay. It is used to compensate the effect of different propagation delays affecting bursts transmitted by different mobiles located at different distances from the same serving BTS. Moreover, to ensure the continuity of communications, even though terminals are moving and the cell coverage is spatially limited, handover mechanisms are introduced. In GSM, the handover is performed also by taking into account the strength of the signal received by a MS from the serving BTS (Received Level—RXLEV).

Embodiments of the present invention will now be described hereinafter, by way of example only, with reference to the accompanying drawings in which.

In the drawings like reference numerals refer to like parts.

Figure 1:
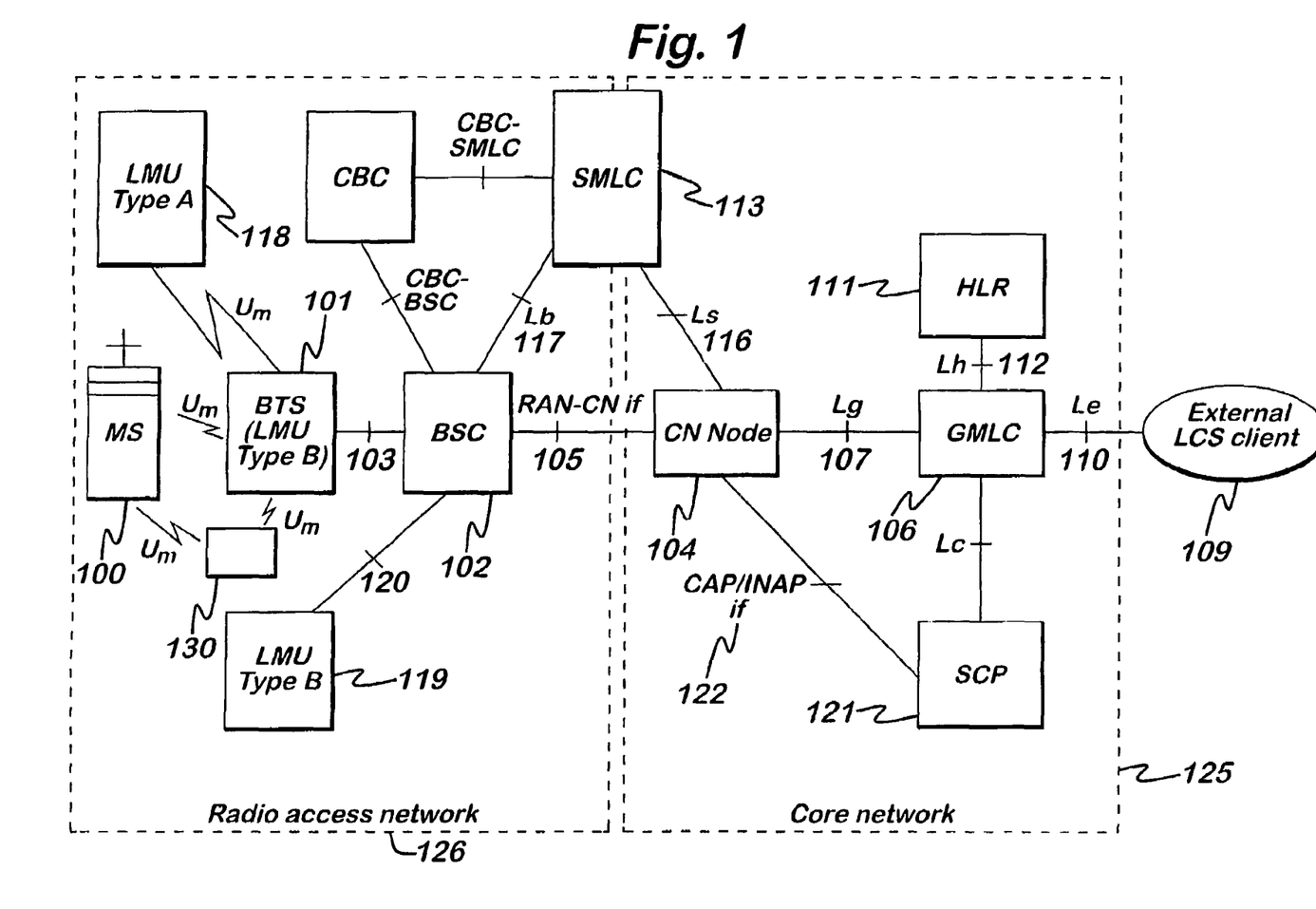
FIG. 1 illustrates a general LCS logical architecture.

Location services (LCS) are logically implemented on the GSM/UMTS (Global System for Mobile communications/Universal Mobile Telecommunications System) structure by the addition of a certain number of network elements. These are the serving mobile location centre (SMLC), the gateway mobile location centre (GMLC), and location measurement units (LMU)'s. A general LCS logical architecture is illustrated in FIG. 1. It will be understood that embodiments of the present invention can be applied to other communication systems.

A mobile station (MS) 100 can be a mobile telephone or a laptop computer which has a radio modem or a fax adapted for radio access. The term MS is used here as an example of mobile user equipment (UE). This communicates with the base transceiver station (BTS) 101 over the radio interface ($U_m$ Interface). The term BTS is used here also to cover the UMTS terrestrial radio access network (UTRAN) corresponding to the network element node B. The BTS is equipment for transmission and reception of signals and may additionally include ciphering equipment. In addition to the BTS 101 the MS 100 can communicate with repeater stations 130 (one shown). These are placed in the communication system by network operators to boost signals from the BTS. They communicate with the MS 100 and/or BTS 101 via the $U_m$ interface. The BTS in turn communicates with a base station controller (BSC) 102 via link 103 (A-Bis in GMS, Iub in UMTS). The term BSC is used here also to cover the UTRAN corresponding network element which is the radio network controller (RNC). The BSC sets up the radio channels for signalling and traffic to the core-network (CN) node 104 via link 105. This forms part of the core-network 125.

The CN node can be either a mobile switching centre (MSC) or serving GPRS support node (SGSN) depending on the switching domain (circuit switched or packet switched). The CN node 104 is a switching node having many functions. In particular, the CN node performs connection management, mobility management and authentication activities. In this example the CN node also contains the cell control function and service switching functions defined by the IN/CAMEL (Intelligent Network/Customized Applications for Mobile network Enhanced Logic) architecture. However, in the package switched domain these before-mentioned CN node functions may be split to separate network elements. Each CN node can control a number of BSC which are referred to as being in an CN node service area. In general BTSs and BSCs together form the radio access network (RAN) 126, which is referred to as the base station sub-system (BSS) in GMS and UTRAN in UMTS.

The CN node 104 is connected to the gateway mobile location centre (GMLC) 106 via the $L_g$ interface 107 which contains functionality required to support LCS. In one PLMN there may be more than one GMLC. The GMLC is the first node an external LCS client accesses in GSM PLMN.

An LCS client 109 is a logical functional entity that requires, from the LCS server function in the PLMN, location information for one or more target MS with a specified set of parameters such as quality of service (QoS). The LCS client may reside in an entity (including for example the MS), within the PLMN or in an entity external to the PLMN. An external LCS client 109 is shown by way of example only in FIG. 1 which communicates with the GMLC 106 via the $L_e$ interface 110.

In response to a location request from an LCS client, the GMLC may request routing information from the home location register (HLR) 111 of the system via the $L_h$ interface 112. The HLR is a database which allows a mobile subscriber to be permanently registered in the system. The HLR keeps track continuously of the location of a subscriber or MS i.e. via the Visitor Location Register (VLR) or SGSN. In addition to the HLR, each CN node 104 is associated with a database containing details of subscribers temporarily in the service area of that CN node. In circuit switched domain this database is called Visitor Location Register (VLR), and in the packet switched domain the database is contained in the SGSN.

After performing registration authorisation the GMLC 106 sends positioning requests to and receives final location estimates from, the CN node in the service area in which the MS is currently located (or visiting).

The serving mobile location centre (SMLC) 113 contains functionality required to support LCS. In one PLMN there may be more than one SMLC 113. The SMLC 113 manages the overall coordination and scheduling of resources required to perform positioning of a mobile station. It also calculates the final location estimate and accuracy.

Two types of SMLC are possible. These are the Core Network (CN) based SMLC, which supports the $L_s$ interface 116 which is the interface between the SMLC and CN node, and the Radio Access Network (RAN) based SMLC which supports the $L_b$ interface 117 between the SMLC 113 and the BSC 102. A CN based SMLC supports the positioning of a target MS via signalling on the $L_s$ interface to the visited CN node. A RAN based SMLC supports positioning via signalling onto the $L_b$ interface. In UMTS, SMLC functionality is contained in the BSC 102, i.e. Radio Network Controller (RNC).

The SMLC can control a number of location measurement units (LMU)'s for the purpose of obtaining radio interface measurements to locate or help locate MS subscribers in the area that it serves.

In order to provide location information about the MS 100, the MS may be involved in various positioning procedures. It may also calculate its own location estimate and accuracy by means of various MS based position calculating methods. These position calculating methods are well known and will not be described in detail hereinafter for the sake of brevity. Alternatively the position of the MS may be calculated in some other part of the communication system.

The LMU (shown in FIG. 1) may make radio measurements to support one or more of these positioning measurements. Two types of LMU are defined. Type A LMU 118 which is accessed over the air interface ($U_m$) and type B LMU 119 which is accessed over the interface 120 to the BSC 102.

A type A LMU is accessed exclusively over the GSM air interface ($U_m$) interface. There is no wired connection to any other network element. A type A LMU has a serving BTS and BSC that provides signalling access to a controlling SMLC. With a CN based SMLC a type A LMU has a serving CN node.

A type B LMU is accessed over the interface 120 from a BSC. The LMU may be either a stand-alone network element addressed using some pseudo-cell ID or connected to, or integrated in, a BTS. Signalling to a type B LMU is by means of messages routed through the controlling BSC for a BSS based SMLC or messages routed through a controlling BSC and CN for a CN based SMLC.

Figure 2:
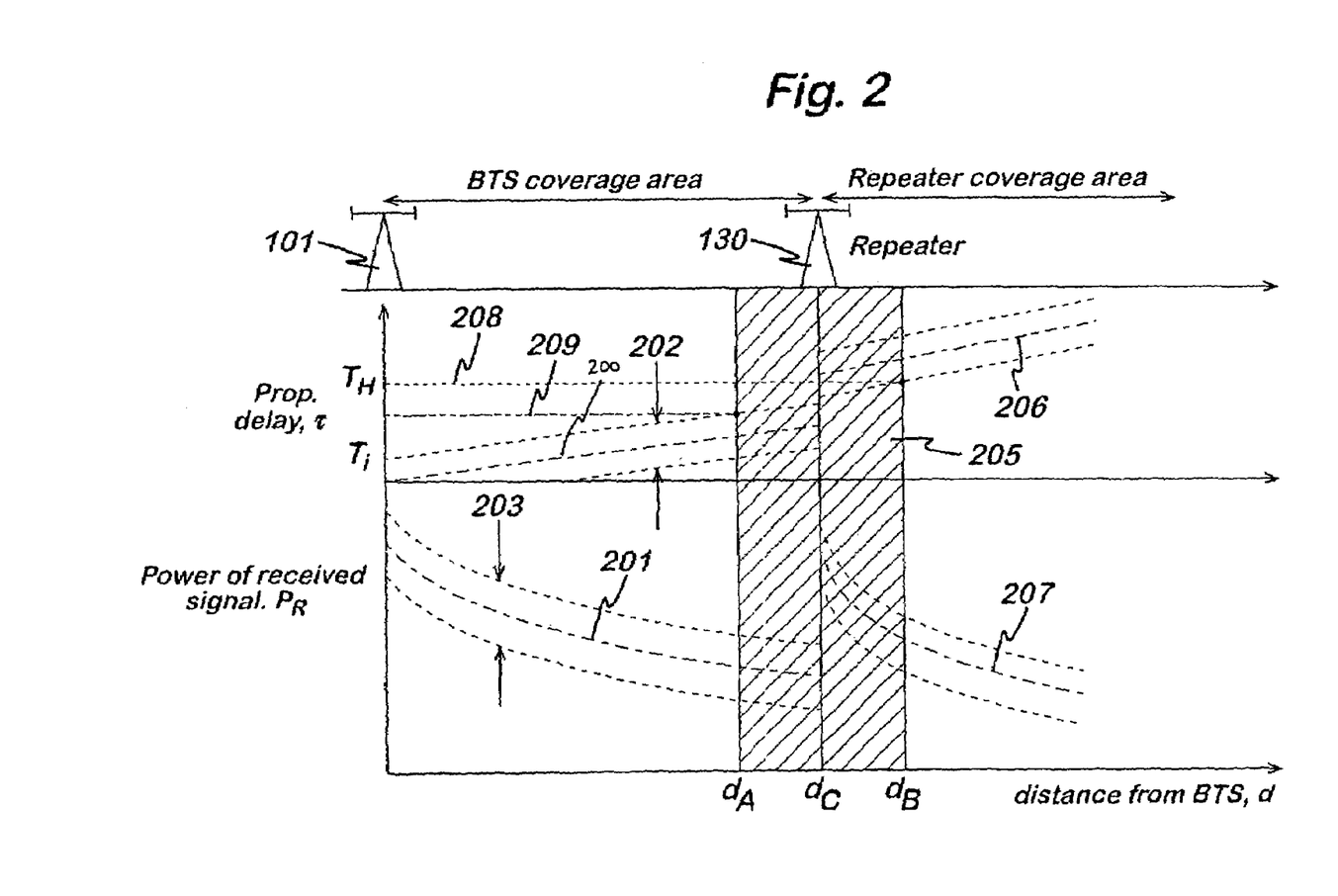
FIG. 2 illustrates the propagation delay and power attenuation of signals received by a MS.

FIG. 2 illustrates how the propagation delay ($\tau$) and power ($P_R$) of signals received at the MS 100 vary as the distance (d) of the MS 100 from the BTS changes. As illustrated the propagation delay shown by curve 200 steadily increases as the distance from the BTS increases. The power of the received signal 201 steadily decreases due to attenuation effects as the signal propagates. Both signals are susceptible to random fluctuations resulting in a band of possible values centred around the two curves 200, 201. These bands are shown as 202, 203 showing the possible range of values, at any distance, for the delay and power signals respectively.

A repeater 130 is placed a distance $d_c$ away from the BTS 101. This may represent a distance at which the signals are becoming so weak that a handover would be likely. This handover zone is illustrated by the shaded region 205 bounded by distances $d_A$ and $d_B$. Alternatively a repeater may be placed at any point where a system operator constructing a communication system may feel it is advisable. The repeater increases the coverage area of the BTS.

Curve 206 illustrates the propagation delay of the signals received by a MS a distance greater than $d_c$ from the donor BTS 101. Curve 207 illustrates the power of the received signal in that region. It will be noted that a discontinuity (or step) takes place in the curves 200, 206 which is due to the internal delay in the repeater. Likewise a discontinuity (or step) takes place in the curves 201, 207 which is due to the power amplification of the repeater which regenerates the power of the received signals. The gain of the repeater may be set to compensate for the attenuation effects.

Figure 3:
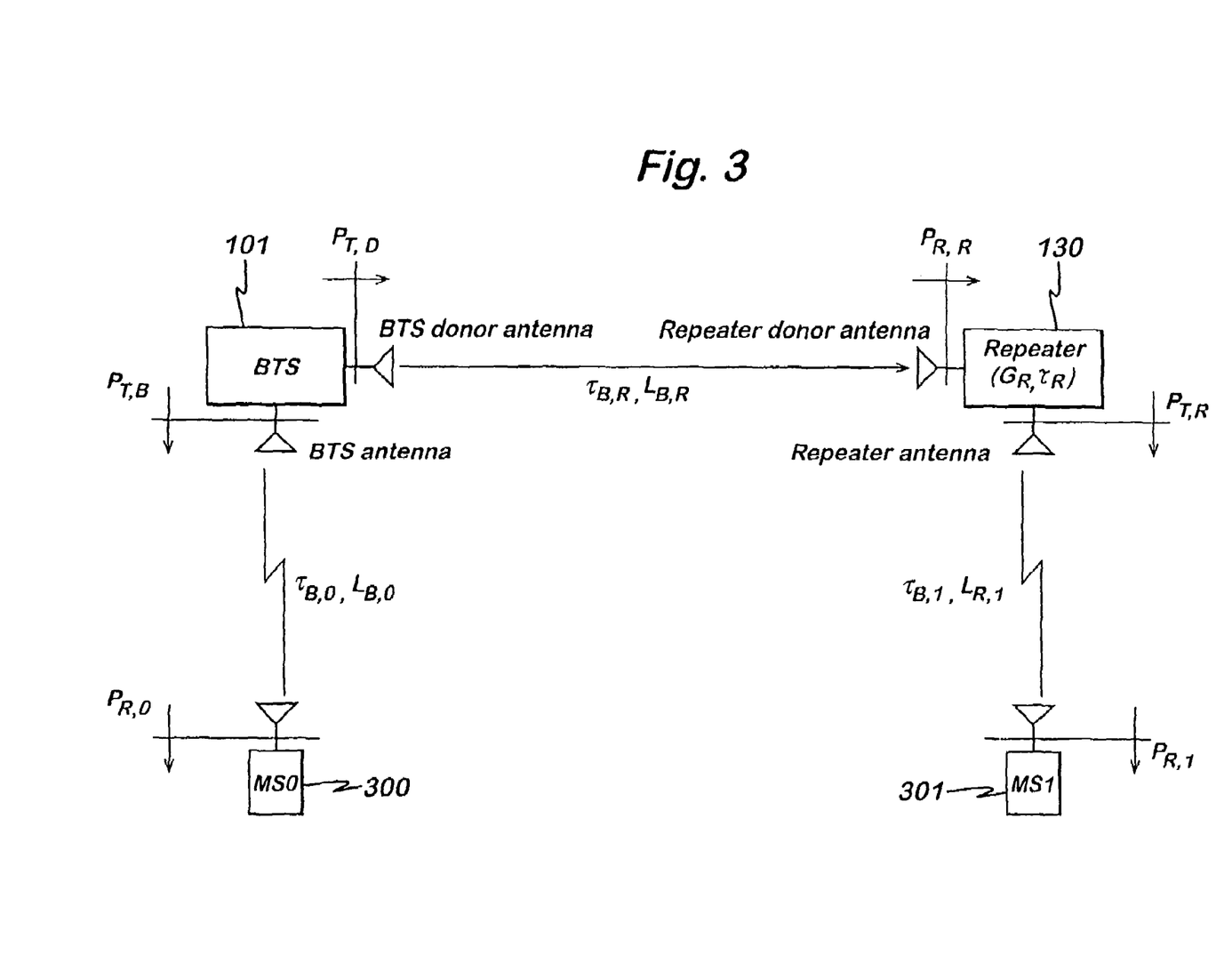
FIG. 3 illustrates a direct link and an indirect link.

FIG. 3 illustrates the power loss and propagation delays in the system. To simplify the example, two terminals, MS0 300 and MS1 301, are considered. It will be understood that the present invention is applicable to use with one or more MS in general. The first mobile station 300 communicates directly with the serving BTS (via a direct link), the second mobile station 301 communicates with the serving BTS through the repeater 130 (via an indirect link). Given the following definitions:

For the Direct Link (BTS-MS0)
  $P_{T,B}$: is the power of the signal transmitted by the serving BTS at the BTS's antenna input, measured in dBm;
  $\tau_{B,0}$: is the propagation delay on the direct link, measured in seconds.
  $L_{B,0}$: is the attenuation on the direct link including the BTS's anntena gain and path-loss, measured in dB;

$P_{R,0}$: is the power of the signal received by the MS on the direct link, measured in dBm;

For the Indirect Link (BTS-Repeater-MS1)
  $P_{T,B}$: is the power of the signal transmitted by the serving BTS at the BTS's donor antenna input on the link BTS-Repeater, measured in dBm;
  $\tau_{B,R}$: is the propagation delay on the link BTS-Repeater, measured in seconds;
  $L_{B,R}$: is the attenuation on the link BTS-Repeater, including the BTS's donor antenna gain, the Repeater's donor antenna gain and the path-loss, measured in dB;
  $P_{R,R}$: is the power of the signal received by the Repeater on the link BTS-Repeater at the output of the Repeater's donor antenna, measured in dBm;
  $\tau_R$: is the Repeater's internal delay, measured in seconds;
  $G_R$: is the gain of the Repeater's amplifier, measured in dB:
  $P_{T,R}$: is the power of the signal transmitted by the Repeater at the Repeater's antenna input, measured in dBm;
  $\tau_{R,1}$: is the propagation delay on the Repeater-MS1 link, measured in seconds;
  $L_{R,1}$: is the attenuation on the Repeater-MS1 link including the Repeater's antenna gain and path-loss, measured in dB;
  $P_{R,1}$: is the power of the signal received by the MS on the indirect link, measured in dBm;

Using this terminology, the power of the signal received by MS0 on the direct link can be expressed as follows:

$$P_{R,0} = P_{T,B} - L_{B,0} \tag{1}$$

The propagation delay of the signal on the direct link is given by:

$$\tau_{BTS \rightarrow MS0} = \tau_{B,0} \tag{2}$$

The equation describing the power of the signal received by MS1 on the indirect link is:

$$P_{R,1} = P_{T,B} - L_{B,R} + G_R - L_{R,1} \tag{3}$$

The propagation delay affecting the signal on the same link is given by:

$$\tau_{BTS \rightarrow MS1} = \tau_{B,R} + \tau_R + \tau_{R,1} \tag{4}$$

The path-loss of the radio signal propagating from BTS to MS0 on the direct link can be expressed as a function of the distance between the BTS antenna and the MS0 antenna, $d_{B,0}$, for example by means of a log-distance path-loss formula as described in Y. Okumura et al., "Field Strength and Its Variability in UHF and VHF Land-mobile Radio Service." *Rev. Elec. Commun. Lab.*, vol. 16, 1968 and M. Hata, "Empirical Formula for Propagation Loss in Land Mobile Radio Services," *IEEE Transactions on Vehicular Technology*, vol. VT-29, no. 3, pp. 317-325, August 1980. The path-loss formula is:

$$L_{B,0} = A_{B,0} + n_{B,0} \log_{10} d_{B,0} \tag{5}$$

Where $A_{B,0}$ is the attenuation at a close-in distance from the BTS antenna and $n_{B,0}$ is the propagation factor. By expressing $d_{B,0}$ as product of the propagation delay over the direct link, $\tau_{B,0}$, and the speed of propagation of the radio waves on the direct link, $c_0$, the received power $P_{R,0}$ in equation (1) and the propagation delay $\tau_{BTS \rightarrow MS0}$ in equation (2) can be connected as follows:

$$\begin{cases} P_{R,0} = P_{T,B} - [A_{B,0} + n_{B,0}\log_{10}(c_0\tau_{B,0})] \\ \tau_{BTS \to MS0} = \tau_{B,O} \end{cases} \quad (6)$$

With analogous definitions, a similar connection can be found between the power of the signal received by the MS through the indirect link, $P_{R,!}$, and the propagation delay affecting the signal on the same link, $\tau_{BTS \to MS!}$:

$$\begin{cases} P_{R,1} = P_{T,D} - L_{B,R} + G_R - [A_{B,1} + n_{B,1}\log_{10}(c_1\tau_{B,1})] \\ \tau_{BTS \to MS1} = \tau_{B,R} + \tau_R + \tau_{R,1} \end{cases} \quad (7)$$

To take into account the uncertainties in the log-distance path-loss models used on the direct link and on the Repeater-MS1 link over the indirect link, two additive random variables, $u_0$ and $u_i$, can be added to the expressions of the received powers $P_{R,0}$ and $P_{R,1}$. Analogously, two additive random variables, $\epsilon_0$ and $\epsilon_1$, can be added to the expressions of the propagation delays $\tau_{BTS \to MS0}$ and $\tau_{BTS \to MS1}$ account for the effect of the impairments over the direct link and over the Repeater-MS1 link on the estimation of the propagation delays.

An additional term, $\delta_R$, can likewise be introduced in the expression of $\tau_{bTS \to MS1}$ to take into account the variations of the repeater's internal delay (due to random variations and variations dependent on the radio signal frequency).

The addition of the uncertainty terms defined above to equations (6) and (7) leads to the following sets of equations:

$$\begin{cases} P_{R,0} = P_{T,B} - [A_{B,0} + n_{B,0}\log_{10}(c_0\tau_{B,0})] + u_0 \\ \tau_{BTS \to MS0} = \tau_{B,0} + \varepsilon_0 \end{cases} \quad (8)$$

$$\begin{cases} P_{R,1} = P_{T,D} - L_{B,R} + G_R - [A_{R,1} + n_{R,1}\log_{10}(c_1\tau_{R,1})] + u_1 \\ \tau_{BTS \to MS1} = \tau_{B,R} + \tau_R + \tau_{R,1} + \varepsilon_1 + \delta_R \end{cases} \quad (9)$$

Referring to equations (8) and (9) one can assume, for simplicity, that the system is ideal (in which case $u_0=0$, $u_i=0$, and $\delta_R=0$) and "completely balanced", meaning that the BTS transmission power on the direct link and on the link with the Repeater's donor antenna is the same ($P_{T,B=P_{T,D}}$). This is the case when the Repeater amplifies the signal received directly from the BTS antenna (i.e. the BTS antenna and the BTS donor antenna are the same antenna). Alternatively a BTS may include more than one antenna in which case to be 'completely balanced' the emitted power on the antennas should match. The attenuation on the radio path between the BTS's antenna and MS0 is the same as the attenuation on the radio path between Repeater's donor antenna and MS1 ($L_{B,0}=L_{R,1}$). The propagation factor and speed on both direct and indirect links are the same ($n_{B,0}=n_{B,1}$ and $c_0=c_1$). Moreover, if the distance between the mobile terminals and the antennas from which they are receiving their signals is the same ($d_{B,0}=d_{R,1}$), the power received by MS1 call be expressed as $P_{R,1}=P_{R,0}-L_{B,R}+G_R$. If the Repeater's internal gain is chosen in such a way to compensate exactly the attenuation over the BTS-Repeater link ($L_{B,R}=G_R$) the power of the signal received by MS0 and MS1 is exactly the same: $P_{R,1}=P_{R,0}$.

In these particular conditions, the power of received signals alone does not allow one to identify which terminal is connected with the BTS through a direct link and which through a repeater. In order to separate direct and indirect connections (communications links) an analysis of the propagation delays should be included. In fact, most likely the propagation delay affecting the signal received by MS1 is larger than the one affecting MS0 In ideal conditions, where there is an absence of uncertainty in propagation delay estimation ($\epsilon_0=\epsilon_1=\delta_R=0$), the propagation delay affecting the signal received by MS1 is $\tau_{BTS \to MS1}$ $\tau_{BTS \to MS0}$ $+\tau_{B,R}$ $+\tau_R$, larger than the propagation delay affecting the signal received by MS0 $\tau_{BTS \to MS0}$ (in fact, $\tau_{B,R}$ $\tau_R \geq 0$). This condition allows one to determine that MS0 is connected to the BTS through a direct link and MS1 through an indirect link.

In a non ideal system ($u_0$, $u_1$, $\epsilon_0$, $\epsilon_1$, $\delta_R$ are non zero), the basic reasonings explained above still hold. However, each single propagation delay and signal power observation is subject to random fluctuations (see FIG. 2). Thus the joint comparison between the pairs ($P_{R,1}$, $P_{R,0}$) and ($\tau_{BTS \to MS1}$, $\tau_{BTS \to MS0}$) may fail to determine which terminal is connected to the Repeater. The size of random fluctuations depends on the propagation environment, characteristics of the hardware used, and properties of the measurement methods used to determine the propagation delay and signal power observations. The dispersion of random fluctuations can be reduced by averaging multiple sets of observation pairs. Thus as the number of samples increases, the variance of the sample mean estimation decreases.

Equations (8) and (9) can be manipulated to obtain the following expressions for the propagation delays affecting the signals received by MS0 and MS1:

$$\begin{cases} BTS \to MS0 = \dfrac{1}{c_0}10^{\frac{P_{T,B}-P_{R,0}-A_{B,0}+n_0}{n_{B,0}}} + 0 \\ BTS \to MS1 = B, R + R + \dfrac{1}{c_1}10^{\frac{P_{T,D}-P_{R,1}-L_{B,R}+G_R-A_{R,1}+n_1}{n_{R,1}}} + 1 + 1 \end{cases} \quad (10)$$

Analogously, the following dual expressions for the power of the signals received by MS0 and MS1 can be obtained:

$$\begin{cases} P_{R,0} = P_{T,B} - \{A_{B,0} + n_{B,0}\log_{10}[c_0(\tau_{BTS \to MS0} - \varepsilon_0)]\} + u_0 \\ P_{R,1} = P_{T,D} - L_{B,R} + G_R - \{A_{R,1} + n_{R,1}\log_{10}[c_1(\tau_{BTS \to MS1} - \tau_{B,R} - \tau_R - \varepsilon_1 - \delta_R)]\} + u_1 \end{cases} \quad (11)$$

Equations 10 and 11 relate the propagation delay to the measured power of the received signals. In equation 10 the delay via a direct ($\tau_{BTS \to MS0}$) or indirect ($\tau_{BTS \to MS1}$) communication link are expressed in terms of the corresponding measured power levels ($P_{R,0}$ and $P_{R,1}$ respectively). In equation 11 the power levels $P_{R,0}$, $P_{R,1}$ received at the MS 300 and 301 respectively are defined in terms of the measured propagation delays. From these two equations it is possible to define two formulations answering the question of whether the signal received by the MS100 propagates through a direct link or indirect link (i.e. via a repeater station 130). These two alternative formulations are:

Formulation A. Given a set of observations of propagation delay $\{\tau_1, \ldots, \tau_n\}$ and corresponding signal power $\{P_{R,1}, \ldots, P_{R,n}\}$, performed on the signals received by a certain MS, decide whether a signal received by the MS is propagating through a direct link.

Formulation B. Given a set of observations of propagation delay $\{\tau_1, \ldots, \tau_n\}$ and corresponding signal power $\{P_{R,1}, \ldots P_{R,n}\}$, performed on the signals received by a certain MS, decide whether a signal received by the MS is propagating through an indirect link.

The solution of the problems stated as above can be found by using Hypothesis Testing techniques which are well known in the art of statistical analysis. In order to apply such techniques the observations need in be characterized statistically. This can be done by using either of the set of equations 10 or the set of equations 11. The information carried by each of the two sets is similar but, for practical reasons, it might be easier to apply the test directly to delay measurements and take implicitly into account the signal power observations, or vice versa. This will depend on the applications, what measurements are available, how they behave statistically, whether analytical expressions or experimentally measured values for the quantities of interest are used, etc.). Furthermore, depending on the application, either Formulation A or Formulation B can be used.

By way of example only the following embodiments are described in respect of the following assumptions.

1. The test is performed according to Formulation A. In other words, the test uses a set of observations to decide with a certain degree of confidence if the MS is receiving the signal from the direct link.
2. The test is performed using the propagation delay measurements as reference observations, taking implicitly into account the signal power observations. In other words, only the set of equations 10 is used.
3. The test is performed by applying techniques of hypothesis testing to the mean value of a set of propagation delay observations. The details of this technique are described hereinafter.
4. Referring to the basic scheme in FIG. 3, the following parameters of direct and indirect link are assumed to be available that is to say can be measured or are already known:

Direct Link: $P_{T,B}$, $A_{B,0}$, $n_{B,0}$, $c_0$

Indirect Link: $P_{T,D}$, $\tau_{B,R}$, $L_{B,R}$, $G_R$, $\tau_R$, $L_{R,1}$, $n_{B,1}$, $c_1$ It will be understood that a test according to Formulation B could be used using either of the sets of equations 10 or 11. Likewise Formulation A could be used but using the set of equations 11 instead of 10.

It is now convenient to introduce a discussion of hypothesis testing which can be applied to the above described problems. Hypothesis testing is a well known type of inferential statistical process. Hypothesis testing techniques can be used to establish whether results observed from an experiment are consistent with a certain understanding (hypothesis) of the underlying physical phenomena. This is achieved by first determining the value for certain statistical properties (e.g., mean value, standard deviation, etc.) of the experiment results that are expected under the assumption that the hypothesis on the underlying physical phenomena is valid. Such expected statistical properties are typically determined before the experiment is performed. When the experiment results are available the analogous statistical properties (e.g., mean value, standard deviation, etc.) are calculated for the measured experimental results. By properly comparing the expected and measured statistical properties of the experiment results it is then possible to decide whether the underlying hypothesis on the physical phenomena is correct with a given degree of confidence.

In the present case embodiments of the present invention comprise collecting a certain set of propagation delays and corresponding signal power levels measured by the MS 100 on its link with the serving BTS. The hypothesis under test is whether the MS 100 is connected with the serving BTS through a direct link (Formulation A). The hypothesis testing for the mean value is considered here. The procedure consists in comparing the average values (mean values) of the propagation delays and power levels observed by the MS 100 with the corresponding quantities that are expected to be measured by the MS 100 if it was connected with the serving BTS through a direct link.

If the observed values differ from the expected mean values by an amount which could be statistically expected (i.e., owing to the random fluctuations of the measurements performed over the direct link) then one can assume that the MS 100 is connected to the serving BTS through a direct link.

If the observed values differ from the expected mean values by an amount which is greater than an amount that could be reasonably determined by random measurement fluctuations then the hypothesis that the MS 100 is connected to the serving BTS through a direct link cannot be accepted. In this case to determine if the MS 100 is connected to the serving BTS through an indirect link, the same set of propagation delay and signal power observations should be tested against the hypothesis that the MS 100 is connected to the serving BTS through an indirect link (i.e., by using Formulation B). A brief discussion of Hypothesis testing for the man value follows but for a fuller understanding reference may be made to A. Papoulis, *Probability, Random Variables, and Stochastic Processes*—3rd Ed., McGraw-Hill, 1991.

By way of example consider that the probability density function (PDF) of a random variable (RV) X is a known function $f_X(x, \theta)$ depending on a parameter $\theta$. The goal of hypothesis testing is to collect a set of observations of the RV X and, on the basis of such observation, test the assumption $\theta = \theta_0$ against the assumption $\theta \neq \theta_0$. Usually the first assumption is denoted as the null hypothesis and the second assumption is denoted as the alternative hypothesis:

$$\begin{cases} H_0: \theta = \theta_0 & \text{(null hypothesis)} \\ H_1: \theta \neq \theta_0 & \text{(alternative hypothesis)} \end{cases}$$

The null and alternative hypothesis are mutually exclusive and are exhaustive. They cannot occur at the same time and no other outcomes are possible.

Generally speaking X is the outcome of a certain experiment. To decide whether the null hypothesis should be accepted or rejected, the experiment is repeated n times and the observed outcomes are collected. The resulting set (or sample) of outcomes $\{x_1, \ldots x_n\}$ is a specific observation of the sample $\{X_1, \ldots X_n\}$ made of n random variables (e.g. $X_i$ is the random variable "outcome of the $i^{th}$ trial" and $x_i$ is a realization of the random variable $X_i$). The decision on whether the null hypothesis should be accepted or rejected is based on experimental evidence. If the sample vector $\{X_1, \ldots, X_n\}$ has a PDF $f(X_1, \ldots X_n; \theta_0)$ which is negligible in a certain region $D_c$ (the critical region) of the sample space, taking significative value in the complement region $\overline{D}_c$, then $H_0$ will be accepted only if the observed sample will fall in $\overline{D}_c$; otherwise $H_0$ will be rejected. In hypothesis testing, two types of error are defined:

Type 1 error.

This error occurs when $H_0$ is true but the experimental evidence results in rejection of it. The probability of a Type I error is $$\alpha = P\{\{X_1, \ldots X_n\} \in D_c | H_0\} \qquad (28)$$

The probability that $H_0$ is accepted when it is true is thus $1 - \alpha$.

Type II error.

This error occurs when $H_0$ is false but the experimental evidence results in the acceptance of it. The probability of a Type II error is in general dependent on $\theta$:

$$\beta(\theta) = P\{X_1, \ldots, X_n\} \in \overline{D}_c | H_1\}$$

The probability that $H_0$ is rejected when it is false is $1-\beta(\theta)=P\{\{X_1,\ldots X_n\}\oplus D_c|H_1\}$ This is the power of the test. The critical region $D_c$ must be chosen to keep both $\alpha$ and $\beta(\theta)$ low, however, when $\alpha$ increases $\beta(\theta)$ decreases and vice versa.

In the case of Hypothesis testing for the mean, $\theta$ is the mean value of the random variable X and $\theta_0$ is the mean value of the random variable X if the null hypothesis $H_0$ holds. Hypothesis testing for the mean uses samples to draw inferences about the mean value of the population. A set of samples is drawn from the population and the average value of such set of samples (sample mean) is compared to the mean of the population under null hypothesis. To make the decision clear cut the sampling distribution is divided into two regions:

Outcomes likely to occur if $H_0$ were true. This occurs when the sample mean has a value close to the mean value of the population under hypothesis $H_0$ (referred to also as "$H_0$ population mean"). In this case the results are consistent with $H_0$. This is also called the region of retention.

Outcomes unlikely to occur if $H_0$ were true. This occurs when the sample mean has a value far from the $H_0$ population mean. In this case the result is not consistent with $H_0$. This is also called the region of rejection or critical region $D_c$.

The critical region $D_c$ is the area of the sampling distribution which contains values that would be very unlikely to occur if the $H_0$ were true. In other words, it is very unlikely that a random sample from the $H_0$ population would result in a sample mean as extreme or more extreme than the one obtained. The critical region is separated from the rest of the sampling distribution based on the value selected for $\alpha$. The critical value is the value for the statistic that serves as the boundary between the critical region and the rest of the sampling distribution.

Figure 3A:
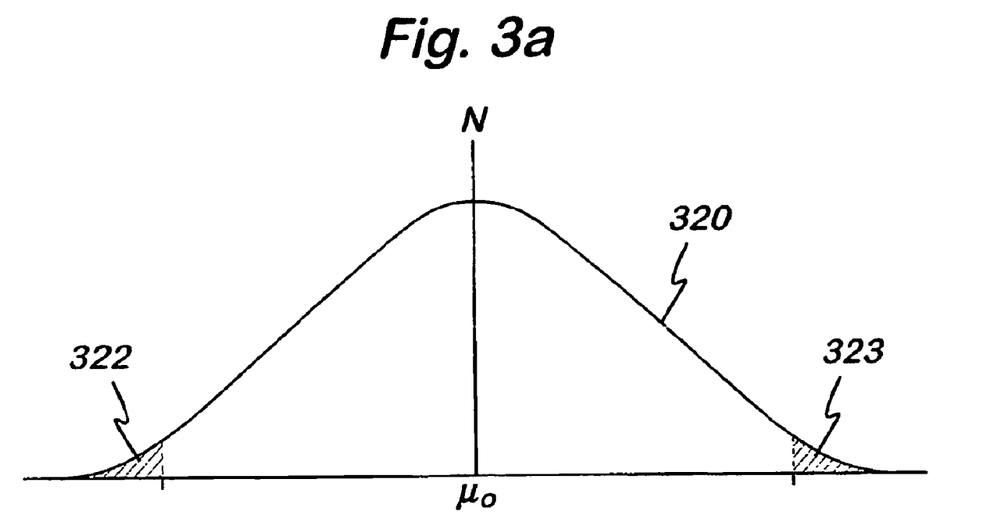
FIGS. 3a and 3b illustrates probability distribution functions.
Figure 3B:
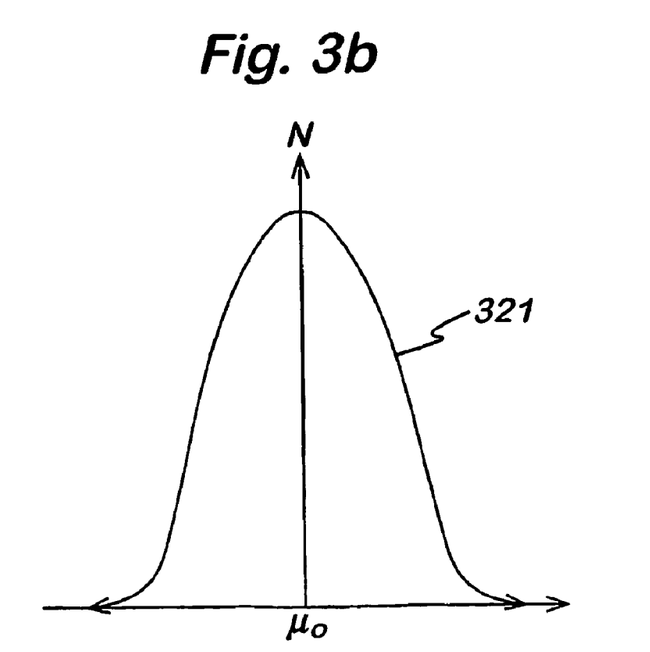

FIGS. 3a and 3b illustrate normal distributions 320, 321 which show how measured results are spread about a central expected average value $\mu_0$. The distributions are symmetric with scores more concentrated in the middle than at the edges (the tails).

The critical regions 322, 323 described hereinabove occurs in these tails and is selected according to the $\alpha$ level selected. For example in FIG. 3a the critical regions are shown hashed. These regions represent values for which it is very unlikely that a random sample from the population would result with.

Hypothesis testing for the mean is usually performed using a "test statistic". The test statistics is a RV Q defined as a function of a sample vector $\{X_1,\ldots,X_1\}$:

$$Q=g(X_1,\ldots,X_n) \quad (30)$$

The transformation $g(X_1,\ldots,X_n)$ could be used for instance to transform an n-dimensional vector $\{X_1,\ldots,X_n\}$ into one single real number.

The test statistics Q has a PDF $f_Q(q,\theta)$. The critical region $R_c$ is the set of the real axis where the PDF of Q under hypothesis $H_0$ (i.e., $f_Q(q,\theta_0)$) is negligible.

Errors of Type I and Type II have the following probabilities:

$$\alpha=P\{\{X_1,\ldots,X_n\}\in R_c|H_0\}=\int_{R_c} f_Q(q,\theta_0)dq$$

$$\beta(\theta)=P\{\{X_1,\ldots,X_n\}\oplus R_c|H_1\}=\int_{R_c} f_Q(q,\theta)dq$$

The test is carried out in the following steps:
1. Select the test statistics Q
2. Determine the PDF of Q, $f_Q(q,\theta)$
3. Observe the sample $\{X_1,\ldots,X_n\}$ and compute $q=g(X_1,\ldots,X_n)$
4. Assign a value for $\alpha$
5. Determine the critical region $R_c$ which ensures that the target $\alpha$ be achieved, minimizing at the same time the corresponding value for $\beta(0)$.
6. Reject $H_0$ if $q\in R_c$ In the case of Hypothesis testing for the mean, $\theta$ is the mean value of the random variable under test X and $\theta_0$ is the mean value of the random variable X if the null hypothesis $H_0$ holds. When this type of test is performed the null hypothesis assumes that the mean $\mu$ of a RV X equals a certain constant $\mu_0$. Alternative hypothesis can be one of the following:

1. $H_1: \mu \neq \mu_0$
2. $H_1: \mu > \mu_0$
3. $H_1: \mu < \mu_0$

Two cases are considered in the following. In the first one the variance $\sigma^2$ of X is known, in the second it is unknown and derived from the sample vector. Variance is an indication of how each of the individual values in a sample differ from the average calculated from the samples.

Case 1: Known Variance

If the variance of X is known to be a $\sigma^2$, the following test statistics can be selected:

$$Q = \frac{\overline{X} - \mu_0}{\sigma/\sqrt{n}} \quad (33)$$

Where $\overline{X}$ is the sample mean defined as:

$$\overline{X} = \frac{\sum_{i=1}^{n} X_i}{n} \quad (34)$$

$\overline{X}$ is a function of the RVs $\{X_1,\ldots X_n\}$; and is thus is a random variable itself. If $\{x_1,\ldots,x_n\}$ are the values of the specific sample extracted, then $\overline{x}$ given by:

$$\overline{x} = \frac{\sum_{i=1}^{n} x_i}{n} \quad (35)$$

is the average of the specific sample extracted i.e., the specific value of the RV $\overline{X}$. The distribution of $\overline{X}$ is Gaussian $\overline{X} \sim N(\mu,\sigma^2/n)$ (if X has a Gaussian distribution) or asymptotically Gaussian (if X does not have a Gaussian distribution but the size of the sample is large, for example n>30). As a consequence, Q is a Gaussian RV $Q \sim N(\mu_Q,\sigma^2/n)$ where:

$$\mu_Q = \frac{\mu - \mu_0}{\sigma/\sqrt{n}} \quad (36)$$

Under hypothesis $H_0$ Q is a standardized Gaussian with mean value 0 and standard deviation 1: $(Q! H_0) \sim N(0,1)$. Given an assigned value for $\alpha$, the hypothesis testing proceeds as described in the remainder of this paragraph for different choices of $H_1$.

More particularly it can be assumed that $f_Q(q,\theta)=f_Q(q,\mu)$ has one maximum and that $f_Q(q,\mu)$ is concentrated on the right hand side of $f_Q(q,\mu_0)$ if $\mu>\mu_0$ and on its left hand side if $\mu<\mu_0$.

1. $H_1: \mu \neq \mu_0$

Since under hypothesis $H_0$, Q calculated from equation (33) is a standardized Gaussian with mean value 0, the null hypothesis is rejected if the samples collected during the experiments lead to a value of the test statistics too large or too small. This rule can be formalized as follows:

$H_0$ is rejected if $q<c_1$, when $\mu<\mu_0$, or if $q>c_2$, when $\mu>\mu_0$

The critical regions is thus $R_c=(-\infty,c_1]\cup[c_2,+\infty)$. For convenience $\alpha$ can be equally distributed over the two semi-axes that determine $R_c$:

$$P\{Q<c_1|H_0\} = \frac{\alpha}{2}; P\{Q>c_2|H_0\} = 1 - \frac{\alpha}{2}$$

Resulting $c_1$ and $c_2$ defined as the $(\alpha/2)^{th}$ and the $(1-(\alpha/2))^{th}$ percentiles of Q:

$$\begin{cases} c_1 = q_{\frac{\alpha}{2}} \\ c_1 = q_{1-\frac{\alpha}{2}} \end{cases}$$

The test can be thus stated as follows:

Accept $H_0$ if and only if $q_{\alpha/2}<q<q_{1-\alpha/2}$ where $\beta(\mu)$ has the following generic expression:

$$\beta(\mu) = \int_{q_{\frac{\alpha}{2}}}^{q_{1-\frac{\alpha}{2}}} f_Q(q, \mu) dq$$

In conclusion, it is important to point out that $q_{\alpha/2}$ and $q_{1-\alpha/2}$ are percentiles of a standardized Gaussian RV with mean value 0 and standard deviation 1. Values for these percentiles can be found in any statistics textbook; some of them are reported in table 1 (for historical reasons the percentiles, which have been indicated as $q_u$ above, when the RV is a standardized Gaussian RV, are denoted as $z_n$).

TABLE 2

| | | | | U | | | | |
|---|---|---|---|---|---|---|---|---|
| | 0.9 | 0.925 | 0.95 | 0.975 | 0.99 | 0.995 | 0.999 | 0.9995 |
| $z_{i1}$ | 1.282 | 1.440 | 1.645 | 1.967 | 2.326 | 2.576 | 3.090 | 3.291 |

2. $H_1: \mu>\mu_0$

In this case, under hypothesis $H_1$, the most likely values of Q calculated from equation (33) are larger than the values of Q under hypothesis $H_0$ (recall that under hypothesis $H_0$ Q is a standardized Gaussian with mean value 0 and standard deviation 1). The null hypothesis should be then rejected if the samples collected during the experiments generate a test statistic too large:

$H_0$ is rejected if $q>c$ and the critical regions is $R_c=[c,+\infty)$. By imposing:

$\alpha=P\{Q>c|H_0\}=1-P\{<c|H_0\}$

In this case c turns out to be the $(1-\alpha)^{th}$ percentile of Q, $c=q_{1-\alpha}$. The test can be thus stated as follows. Accept $H_0$ if and only if $q<q_{1-\alpha}$ $\beta(\mu)$ has the following generic expression:

$$\beta(\mu) = \int_{-\infty}^{q_{1-\alpha}} f_Q(q, \mu) dq$$

$q_{1-\alpha}$ is the $(1-\alpha)^{th}$ percentile of a standardized Gaussian RV with mean value 0 and standard deviation 1 (see table 1).

3. $H_1: \mu<\mu_0$

Following reasoning analogous to that of the preceding cases, the null hypothesis should be then rejected if the samples collected during the experiments generates a test statistic too small:

$H_0$ is rejected if $q<c$ and the critical regions is $R_c=(-\infty,c)$. By imposing $\alpha=P\{Q<c|H_0\}$ c turns out to be the $\alpha$-th percentile of Q, $c=q_\alpha$. The test can be thus stated as follows:

Accept $H_0$ if and only if $q>q_\alpha$ $\beta(\mu)$ has the following generic expression:

$$\beta(\mu) = \int_{q_\alpha}^{+\infty} f_Q(q, \mu) dq$$

In this case $q_\beta$ is the $\alpha$-$^{th}$ percentile of a standardized Gaussian RV with mean value 0 and standard deviation 1 (see table 1).

Case 2: Unknown Variance

If the standard deviation $\sigma$ of the population, is unknown, the following normalized RV can be used as the test statistics:

$$Q = \frac{\overline{X} - \mu_0}{S/\sqrt{n-1}} \quad (37)$$

where $$S^2 = \frac{\sum_{i=1}^{n}(X_i - \overline{X})^2}{n} \quad (38)$$

S is the sample variance. Now both $\overline{X}$ and $S^2$ are random variables, being functions of the RVs $\{X_1, \ldots X_n\}$.

It can be shown from "A. Papoulis, *Probability, Random Variables and Stochastic Processes*—$3^{rd}$ Ed., McGraw-Hill, 1991" that under hypothesis $H_0$, the RV Q defined in (37) has a t-Student distribution with n−1 degrees of freedom if the distribution of the population from which the sample of dimension n has been extracted has a Gaussian distribution or the distribution of the population is not Gaussian but it is bell-shaped as the Gaussian.

The analytical expression of the probability density function of a random variable l with a t-Student distribution and with n−1 degrees of freedom is:

$$f_T(t) = \frac{\Gamma\left(\frac{n+1}{2}\right)}{\sqrt{n\pi}\,\Gamma\left(\frac{n}{2}\right)}\left(1 + \frac{t^2}{n}\right)^{-\frac{n+1}{2}} \quad (-\infty < t < \infty); E\{T\} \quad (39)$$

$$= 0; E\{T^2\} = \frac{n}{n-2}(n>2)$$

$f_T(t)$ is symmetric; thus the p-$^{th}$ and the (1−p)-$^{th}$ percentiles are such that $t_{1-p}=-t_p$. Recall that the p-$^{th}$ percentile of the random variable t is such that $P(t \leq t_p)=p$ and, for symmetric distributions, $P(-t_p \leq t \leq t_p))=2p-1$.

The same results as those obtained in the case of unknown variance can be used when the variance $\sigma^2$ is not known, provided that the percentiles used are the ones of a t-Student RV with n−1 degrees of freedom, $t_u(n-1)$.

1. $H_1: \mu \neq \mu_0$

Accept $H_0$ if and only if $$t_{\frac{\alpha}{2}}(n-1) < q < t_{1-\frac{\alpha}{2}}(n-1)$$

$$\beta(\mu) = \int_{t_{\frac{\alpha}{2}}(n-1)}^{t_{1-\frac{\alpha}{2}}(n-1)} f_Q(q,\mu)dq$$

2. $H_1: \mu > \mu_0$

Accept $H_0$ if and only if $q < t_{1-\alpha}(n-1)$ $$\beta(\mu) = \int_{-\infty}^{t_{1-\alpha}(n-1)} f_Q(q,\mu)dq$$

3. $H_1: \mu < \mu_0$

Accept $H_0$ if and only if $q > t_\alpha(n-1)$ $$\beta(\mu) = \int_{t_\alpha(n-1)}^{+\infty} f_Q(q,\mu)dq$$

Some of these percentiles $t_k(n)$ are reported in table 2.

TABLE 2

| | U | | | | |
|---|---|---|---|---|---|
| | 0.9 | 0.95 | 0.975 | 0.99 | 0.995 |
| n = 1 | 3.08 | 6.31 | 12.7 | 31.8 | 63.7 |
| 2 | 1.89 | 2.92 | 4.30 | 6.97 | 9.93 |
| 3 | 1.64 | 2.35 | 3.18 | 4.54 | 5.84 |
| 4 | 1.53 | 2.13 | 2.78 | 3.75 | 4.60 |
| 5 | 1.48 | 2.02 | 2.57 | 3.37 | 4.03 |
| 6 | 1.44 | 1.94 | 2.45 | 3.14 | 3.71 |
| 10 | 1.37 | 1.81 | 2.23 | 2.76 | 3.17 |
| 20 | 1.33 | 1.73 | 2.09 | 2.53 | 2.85 |
| 30 | 1.31 | 1.70 | 2.05 | 2.46 | 2.75 |

The t-Student distribution is asymptotically Gaussian, in fact for:

$$\text{for } n > 30, t_u(n) = z_u \sqrt{\frac{n}{n-2}}$$

Returning to Formulation A of the problem hereinbefore mentioned the null hypoythesis $H_0$ and the alternative hypothesis $H_1$ are defined as follows:

$$\begin{cases} H_0: MS \text{ connected through direct link} \\ H_1: MS \text{ not connected through direct link} \end{cases}$$

In order to apply hypothesis testing to observations of the propagation delay affecting the signal received by the MS (either on the direct or on the indirect link), the propagation delay is modeled as a random variable (RV), X (i.e, X= $\tau_{BTS->MS}$). For a given value of received power, $P_R$, the RV X is defined as follows by using equation (10):

$$X=D[[\div]]+K(P_R) \cdot \eta + v \quad (13)$$

where D, K, $(P_R)$, $\eta$, $v$ have different definitions depending on which hypothesis holds (see table 3). The physical meaning of each term in (13) is explained below:

D is a constant factor representing the additional delay introduced by the repeater.

It includes the repeater internal delay ($\tau_R$) and the delay introduced by the link between BTS and repeater ($\tau_{B,R}$). By definition, this additional delay is non zero only under hypothesis $H_1$. While $\tau_{B,R}$ depends on the particular configuration of the link between donor BTS and Repeater (Distance, if the link is a radio link. Group delay and length of the cable, if the link is through a cable of optical fibre. etc.). $\tau_R$ depends on the Repeater's hardware. A commercial repeater in the 900 Mz bandwidth may typically have group delay $\tau_R < 5$ μs.

TABLE 3

| | Under hypothesis $H_0$ | Under hypothesis $H_1$ |
|---|---|---|
| D | 0 | $\tau_{B,R} + \tau_R$ |
| $K(P_R)$ | $\frac{1}{c_0} 10^{\frac{P_{T,B}-P_R-A_{B,0}}{n_{B,0}}}$ | $\frac{1}{c_1} 10^{\frac{P_{T,D}-P_R-L_{B,R}+G_R-A_{R,0}}{n_{R,1}}}$ |
| $\eta$ | $\frac{1}{c_0} 10^{\frac{u_0}{n_{B,0}}}$ | $\frac{1}{c_1} 10^{\frac{u_1}{n_{R,1}}}$ |
| $v$ | $\epsilon_0$ | $\epsilon_1 + \delta_R$ |

K $(P_R)$ is a function of the power received by the MS, $P_R$. Once $P_R$ is known from the observations, K $(P_R)$ is constant. Physically. K $(P_R)$ is a delay equivalent to the attenuation experienced by the received signal. The equivalence between attenuation of the received signal and delay is calculated by considering that the power of the signal received by the MS decreases with the distance, which in turns makes the delay increase.

Among the others, K $(P_R)$ depends on $(A_{B,0}, n_{B,0})$ on the direct link, and $(A_{R,1}, n_{R,1})$ on the indirect link. The value of such parameters can be derived for example from the basic Okumura-Hata model as described in Y. Okumura et al., "Field Strength and Its Variability in UHF and VHF Land-mobile Radio Service", Rev, *Elec. Commun. Lab.*, vol. 16, 1968. Typical values in an urban environment, for a BTS antenna height of 50 metres and an MS height of 1.5 meters are 123.3 and 33.7, respectively. It is possible to include in $A_{B,0}$ (or in $A_{R,1}$) an additional term to take into account the additional path-loss due to the penetration of radio waves inside buildings. The Referecnce ETSI, Technical Report "Digital cellular telecommunications system (Phase 2+); Radio network planning aspects (GSM 03.30 version 8.3.0 Release 1999)," doc. ETSI TR 101 362 V8.3.0 (2000-04)

suggests to use for this additional term 10 dB in rural and suburban environments and 15 dB in urban environment.

η depends on the uncertainties in the log-distance path-loss attenuation model; thus it represents the fluctuations of the propagation delay due to the propagation over the mobile radio channel.

Usually $u_0$ and $u_1$ are modelled as log-normal random variables as illustrated in W. C. Y. Lee, *Mobile Cellular Telecommunications Systems*, McGraw-Hill Book, 1990. The random variables are $u_o \sim N(0,\sigma_0)$ and $u_1 \sim N(0,\sigma_1)$. Under this assumption, the probability density function (PDF) of η can be calculated with standard RV transformation techniques as illustrated in A. Papoulis, *Probability, Random Variables, and Stochastic Processes*—$3^{rd}$ Ed., McGraw-Hill, 1991.

$$f_\eta(y) = \frac{1}{\sqrt{2\pi}\sigma} \frac{n}{y \ln 10} e^{-(n\log_{10} y)^2/2\sigma^2} u(y) \qquad (14)$$

Where u(y) is the "step function" (equal to 1 if y is positive and equal to zero otherwise), (n,σ) represent $(n_{B,0}, \sigma_0^u)$ under hypothesis $H_0$ and $(n_{R,1}, \sigma_1^u)$ under hypothesis $H_1$. The corresponding expected value and variance of η are $$\mu_\eta = E\{\eta\} = e^{(ln10/n)^2/(\sigma^2/2)} \qquad (15)$$

$$\sigma_\eta^2 = E\{(\eta-\mu_\eta)^2\} = e^{(ln10/n)^2/\sigma^2}(e^{(ln10/n)^2/\sigma^2} - 1) \qquad (16)$$

ν represents the fluctuations in the propagation delay observations ($\epsilon_0$ and $\epsilon_1$) and, in case of connection through the indirect link, also the random fluctuations of the repeater internal delay ($\delta_R$).

When considering the application of this method to a GSM system, the propagation delay measurements are made available by the parameter Timing Advance (TA). This means that the error contributions $\epsilon_0$, $\epsilon_1$ include the error made when the TA is used as an estimate of the propagation delay (or alternatively, of the absolute distance) between serving BTS and MS. A statistical characterization of such error has proved to be important also to implement LCS location algorithms based on Cell Identity (CI) and Timing Advance (TA), for example. Thus, the need of statistical information about $\epsilon_0$ and $\epsilon_1$ to detect the presence of a repeater in LCS applications does not represent a problematic issue, since such data is already available to estimate the MS coordinates. Alternatively according to embodiments of the present invention equipment for calculating these values may be provided in the communication system. The statistics of $\epsilon_0$ and $\epsilon_1$ depend heavily on the environment and changes also with the value of TA. Depending on the environments, average values for $\epsilon_0$ and $\epsilon_1$ may vary between −0.75 μs and 0.75 μs (corresponding to distances in the range −400 to 400 meters). The standard deviation is commonly about 0.75-1.7 μs (corresponding to 400-500 meters).

In the following it is explained how, using classical hypothesis testing techniques, the repeater detection problem can be solved. Techniques for hypothesis testing of the mean are considered. In order to apply hypothesis testing techniques to the mean value of X, the mean value of X under hypothesis $H_0$ ($\mu_0$) and the standard deviation of X under hypothesis $H_0$ ($\sigma_0$) should be determined.

The average value of X defined in (13) under hypothesis $H_0$ and under hypothesis $H_1$ can be expressed as follows:

$$\mu = \qquad (18)$$

$$E\{X\} = \begin{cases} K(P_R \mid H_0) \cdot E\{\eta \mid H_0\} + E\{\epsilon_0\} & \text{if } H_0 \\ K(P_R \mid H_1) \cdot E\{\eta \mid H_1\} + E\{\epsilon_1\} + E\{\delta_R\} + \tau_{B,R} + \tau_R & \text{if } H_1 \end{cases}$$

Where $E\{.\}$ is the expected value and $K(P_R|H_0)$ and $K(P_R|H_1)$ can be found in table 3 and $$\begin{cases} E\{\eta \mid H_0\} = e^{(\ln 10/n_{B,0})^2/(\sigma_0^{u^2}/2)} \\ E\{\eta \mid H_1\} = e^{(\ln 10/n_{R,1})^2/(\sigma_1^{u^2}/2)} \end{cases} \qquad (19)$$

The knowledge of the variance of X affects the selection of the hypothesis testing technique. As mentioned above two classes of test exist. One assumes that the variance of the RV X is known prior collecting the observations, the other one assumes that the variance is unknown prior to collecting the observations and thus needs to be estimated from the observations themselves. If the variance is known a priori the test statistics (33) is used. If the variance of X is not known a priori the test statistics (37) is used.

The variance can be pre-determined by taking measurements when setting up the communication system or by calculating it analytically. In the example considered here (in which a test is performed according to Formulation A, using propagation delay observations) the variance of the observation X under hypothesis $H_0$ and under hypothesis $H_1$ has the following analytical expression, obtained assuming that η and ν are independent, as well as $\epsilon_1$ and $\delta_R$:

$$\sigma^2 = Var\{X\} = \qquad (20)$$

$$E\{(X-\mu)^2\} = \begin{cases} K^2(P_R \mid H_0) \cdot Var\{\eta \mid H_0\} + Var\{\epsilon_0\} \\ K^2(P_R \mid H_1) \cdot Var\{\eta \mid H_1\} + Var\{\epsilon_1\} + Var\{\delta_R\} \end{cases}$$

where $$\begin{cases} Var\{\eta \mid H_0\} = e^{(\ln 10/n_{B,0})^2/(\sigma_0^{u^2})}\left(e^{(\ln 10/n_{B,0})^2/\sigma_0^{u^2}} - 1\right) \\ Var\{\eta \mid H_1\} = e^{(\ln 10/n_{R,1})^2/(\sigma_1^{u^2})}\left(e^{(\ln 10/n_{R,1})^2/\sigma_1^{u^2}} - 1\right) \end{cases} \qquad (21)$$

If the variance is not pre-determined or else if a large (for example greater than 30) number of readings are available, equation (38) can be used to estimate the variance of X from the sample observation.

Under hypothesis $H_0$ the analytic expressions of average value and variance of the propagation delay observation are thus $$\mu_0 = E\{X \mid H_0\} = \frac{1}{c^0} 10^{\frac{P_{T,B} - P_R - A_{B,0}}{n_{B,0}}} \cdot e^{(\ln 10/n_{B,0})^2/(\sigma_0^{u^2}/2)} + E\{\epsilon_0\} \qquad (22)$$

$$\sigma_0 = Var\{X \mid H_0\} = \left(\frac{1}{c_0} 10^{\frac{P_{T,B} - P_R - A_{B,0}}{n_{B,0}}}\right)^2 \cdot \qquad (23)$$

$$e^{(\ln 10/n_{B,0})^2/(\sigma_0^{u^2})}\left(e^{(\ln 10/n_{B,0})^2/\sigma_0^{u^2}} - 1\right) + Var\{\epsilon_0\}$$

These values take into account design parameters ($P_{T,B}$), statistical properties of the propagation delay measurement error ($\epsilon_0$), properties of the propagation channel ($c_0$, $A_{B,0}$, $n_{B,0}$, $\sigma_0^u$). Depending on the cases (for example if analytic expression for the variance is available, then it can be used. If it is not available or it is not reliable, then it can be pre-determined through experimental measurements. Finally, it the variance cannot be pre-determined in any way, then it must be estimated from the observations.) it may be more convenient to apply the hypothesis test method assuming that the variance is known (in this case the variance would be given by expression 23 and the technique described hereinabove for known variance should be used) or unknown (in this case the variance would be estimated from the set of observations and the technique described hereinabove for unknown variance should be used.).

The alternative hypothesis is then chosen among three possible alternatives; $H_1: \mu \neq \mu_0$, $H_1: \mu > \mu_0$ and $H_1: \mu < \mu_0$. Which alternative hypothesis should be chosen, depends on the particular application. In th example described (test performed according to Formulation A, using propagation delay observations) one way to proceed in the selection of the alternative hypothesis is to compare the value of $\mu$ under hypothesis $H_0$ and the value of $\mu$ when hypothesis $H_0$ does not hold. The difference $(\mu|H_1)-(\mu|H_0)$ can be considered for this purpose. This is because this quantity is a comparison "of $\mu$ under hypothesis $H_0$ and the value of $\mu$ when hypothesis $H_0$ does not hold" from equation (18) it results that:

$$(\mu | H_1) - (\mu | H_0) = K(P_R | H_1) \cdot E\{\eta | H_1\} - \qquad (24)$$
$$K(P_R | H_0) \cdot E\{\eta | H_0\} + E\{\varepsilon_0\} - E\{\varepsilon_1\} + E(\delta_R) + \tau_{B,R} + \tau_R$$

Specific considerations should be made case by case. However, by assuming the same propagation parameters for the link between donor BTS and MS (on the direct link) and between Repeater and MS (on the indirect link), the following simplifications result: $E\{\varepsilon_0\}=E\{\varepsilon_1\}$ and $E\{\eta|H_1\}$: in fact, $c_0=c_1=c$ (where c is the speed of propagation of the radio waves). $A_{B,0}=A_{R,1}=A$; $n_{B,0}=n_{R,1}=n$ and $\sigma_0^u=\sigma_1^u$. Moreover, by assuming $E\{\delta_R\}=0$ then $(\mu|H_{,1})-(\mu|H_{,0})$ turns out to have the following expression:

$$(\mu | H_1) - (\mu | H_0) = [K(P_R | H_1) - K(P_R | H_0)] \cdot E\{\eta\} + \tau_{B,R} + \tau_R \qquad (25)$$

$$= \frac{1}{c} 10^{\frac{P_R - A}{n}} 10^{\frac{P_{T,B}}{n}} \left[ -10^{\frac{P_{T,D} - L_{B,R} + G_R}{n}} \right] \cdot E\{\eta\} + \tau_{B,R} + \tau_R \qquad (26)$$

In the case of a system where the Repeater is receiving the signal directly from the BTS antenna (which thus coincides with the BTS donor antenna), $P_{T,B}=P_{T,D}$. Moreover, if the attenuation on the link between donor BTS antenna and Repeater donor antenna is balanced ($L_{B,R}=G_R$) the terms between parenthesis cancel out and the difference between average values is simply given by:

$$(\mu|H_1)-(\mu|H_0)=\tau_{B,R}-\tau_R \qquad (27)$$

Thus $(\mu|H_1) \geq (\mu, H_0)$ and the alternative hypothesis $H_1: \mu > \mu_0$ should be selected for the test. Since in the example considered here the null hypothesis $H_0$ is "MS connected through direct link", the alternative hypothesis $H_1$ is "MS not connected through direct link" and the observation X represents a propagation delay, the alternative hypothesis is certainly $H_1: \mu > \mu_0$. This is because under alternative hypothesis the MS is expected to be connected through the repeater, which, due to its internal delay, increases the average value of the observed propagation delay.

Following a dual reasoning, the alternative hypothesis $H_1: \mu < \mu_0$ would be selected if Formulation B was used. In fact in Formulation B $\mu_0$ represents the average propagation delay under the assumption that the MS is connected through indirect link (null hypothesis $H_0$). If that assumption does not hold (i.e., if $H_1$ holds: the MS is not connected through repeater) the average propagation delay is expected to be lower than $\mu_0$, thus $H_1: \mu < \mu_0$ should be selected.

Figure 4:
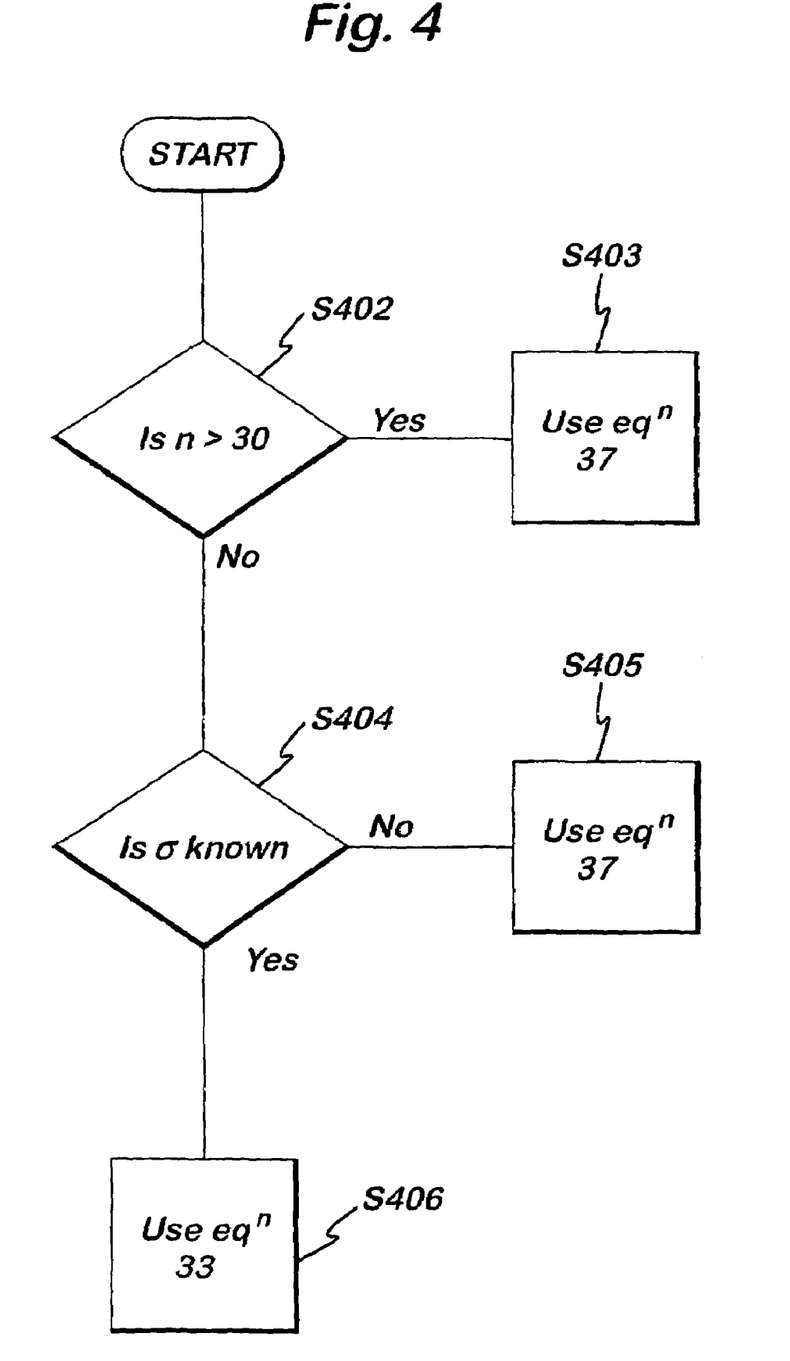
FIG. 4 illustrates how a choice of equations is made.

FIG. 4 illustrates the selection of normal and t-distributions when testing a claim about the population mean. At step S401 the selection is begun. The first question asked is whether the number of samples n is large enough (for example, n is greater than 30). This is step S402. If the number of sample measurements is large enough (for example, n is greater than 30) then equation 37 is used. This is used regardless of whether the variance $\sigma$ is used since it will more accurately provide an answer. This is step S403. If the number n is not large enough (for example n is less than or equal to 30) the question of whether the variance $\sigma$ is known is asked at step S404. If the variance is not known then equation 37 is used to calculate the test statistic Q at step S405. Otherwise equation 33 is utilized for the test statistic at step S406.

In each of equations 37 and 33 the value $\mu_0$ which represents the average value of the population under hypothesis H0. Such value can be calculated using the formula given by equation 22 and by substituting therein values of the system such as transmitted power and attenuation effects as above described. The variance $\sigma$ can likewise be calculated for use with equation 33 using equation 23. Alternatively when equation 37 is used the variance or spread is given by S shown in equation 38 which may be calculated from the population sample.

It will be understood that the values for the variance and expected value under hypothesis $H_0$ ($\mu_0$, $\sigma_0$) may be calculated from system parameters using equations analogous to 22 and 23 or may be determined experimentally when other formulations of the hypothesis test are used.

Having determined a value for the test statistic via either equation 33 or 37 this is compared with the critical region under the particular alternative hypothesis selected. In the above described specific example the alternative hypothesis $H_1: \mu > \mu_0$ is described as being the best possible test. It will be understood that other alternative hypothesis for testing the null hypothesis could be used if, for instance, Formulation B was used and/or received signal power observations were used instead of propagation delay observations.

If the test statistic value falls within the critical region, as determined for the particular level of certainty $\alpha$ chosen then one can say that the two values, for the mean, that is the expected value and the measured sample value, vary by an amount which is statistically significant. That is to say the difference is not likely to be due merely to the random fluctuations but is likely to be to a discontinuity. The null hypothesis, that the signal receives the signals via a direct link, must be rejected and the MS cannot be assumed being connected to the serving BTS through a direct link.

It will be understood that the present invention is equally applicable to use with the null hypothesis that the MS receives signals via an indirect link (Such as by using Formulation B above) and/or by using received signal power observations.

Figure 5:
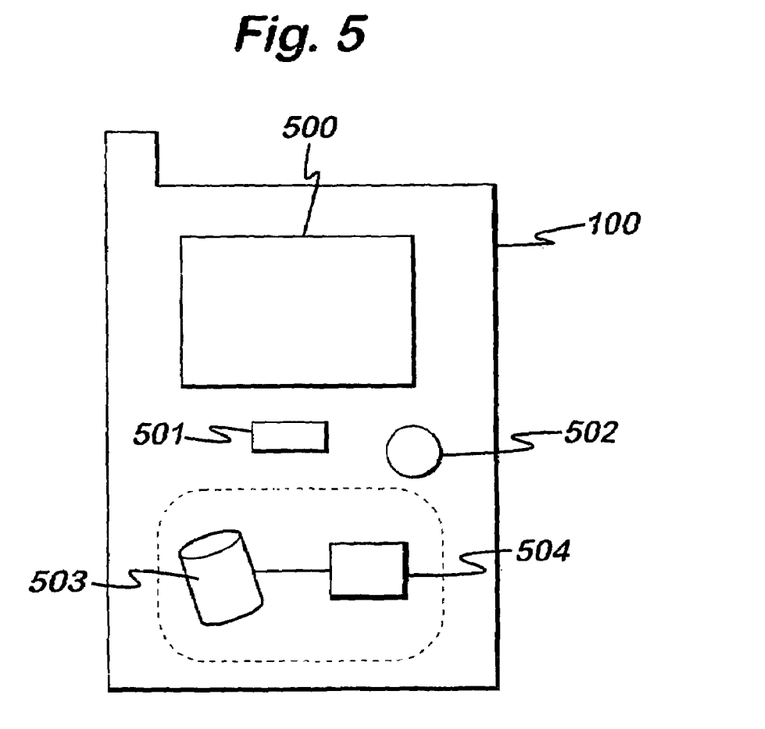
FIG. 5 illustrates a mobile user equipment.
Figure 6:
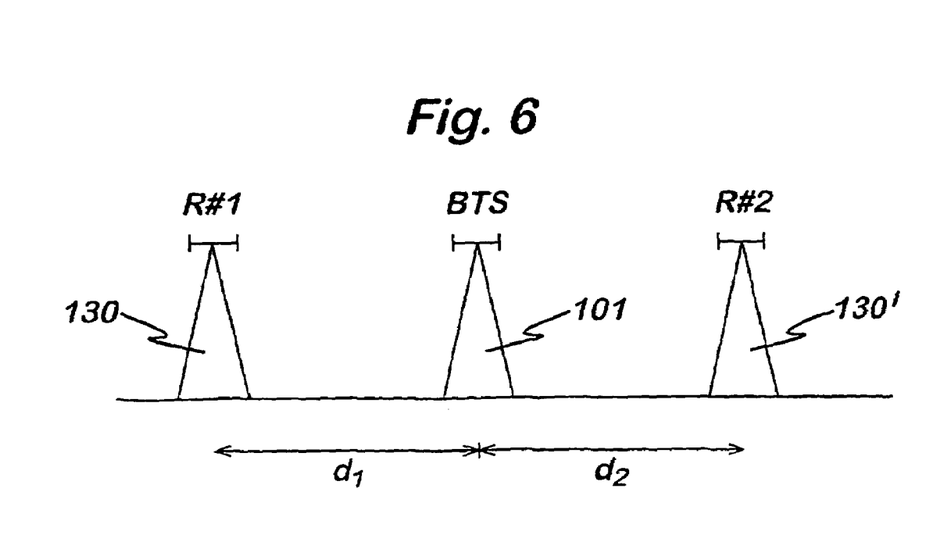
FIG. 6 illustrates a multi-repeater system.

FIG. 5 illustrates a MS 100 in which functionality to enable the above described embodiments to be put into practice, could be stored. It will be understood of course that such functionality could be stored in any other suitable network element. For example in the LMU or SMLC. The MS 100 includes a display 500 and buttons 501, 502 which together with other buttons, microphone and earphone (not shown) comprise a user interface. In FIG. 6 the MS has been cut away to show a data store 503 and control apparatus 504.

The data store 503 stores the various hypothesis testing algorithms and details of the equations needed to enable the mean values and variance of sample measurements to be calculated.

It will be understood that the method described hereinabove is generally applicable and that alternative implementations can be considered to suit particular cases without departing from the scope of the present invention. For example according to embodiments of the present invention by observing FIG. 2 it can be seen that outside of the shaded region, indicating the border between BTS coverage area and Repeater coverage area (i.e., for $d > d_B$), the propagation delay information alone is enough to determine whether the MS is in the BTS coverage area or in the Repeater coverage area.

In these circumstances, the repeater detection problem can be implemented by first using a reduced test that decides whether the MS is in the border region or not on the basis of propagation delay observations only. Afterwards, only if the MS turns out to be in the border region are propagation delay and received level observations used jointly in a complete test.

The reduced test is a test for the mean value of the propagation delay with the following hypothesis.

$$\begin{cases} H_0 : \mu = \mu'_0 (MS \text{ in the border}) \\ H_1 : \mu \neq \mu'_0 (MS \text{ not in the border area}) \end{cases}$$

Where $\mu_0'$ is the average value of the propagation delay in the shaded area 205.

This test determines two thresholds, $\tau_H$ 208 and $\tau_L$ 209 such that, if $\tau_L < \tau < \tau_H$ the hypothesis $H_0$ is accepted and nothing can be said yet about the eventual presence of a Repeater. Thereafter the complete test using both propagation delay observations and signal strength observations as above described needs to be performed. If $\tau$ is smaller than $\tau_L$, the MS can be assumed to be within the BTS coverage area while if $\tau > \tau_H$, the MS can be assumed within the Repeater coverage area.

The additional requirement of this implementation is the need to specify $\mu_0'$ in the reduced test. $\mu_0'$ would need to be specified using additional information not embedded in the observations. For example, $\mu_0'$ can be determined from the network design parameters or obtained via experimental measurements. $\mu_0'$ depends on the radius of the BTS coverage area, the Repeater's internal delay and properties of the propagation delay random fluctuations. In the complete test it is not needed to specify $\mu_0'$ because signal strength observations carry intrinsically an indication of the average expected propagation delay.

FIG. 4 represents one case where the method and apparatus of embodiments of the present invention can be adapted to uniquely identify the repeater. In the configuration presented, the donor BTS 101 is connected to two repeaters 130, 131 installed at exactly the same distance from the BTS ($d_1 = d_2$). In these circumstances, if the two indirect links (from donor BTS to Repeater 1 and from donor BTS to Repeater 2) are identical, and the repeaters are identical, even though the method so far proposed is able to detect the presence of a repeater from the observations, the particular configuration does not allow for the determination of from which one of the two repeaters the signal is actually coming.

Under these circumstances one possible way to overcome this limitation is to exploit the eventually available measurements performed by the MS from neighbour cells. If the algorithm determines that the MS is connected to the donor BTS through a repeater, even the identity of the neighbour cells alone may be used to indicate what is the geographical region where the MS is located. In such circumstances, the repeater closest to the region where the neighbour cells are located can be selected.

Embodiments of the present invention need several parameters in order to be implemented. Many parameters are likely to be available from radio network databases (transmission powers, repeater's internal delay and gain, etc.). Some others need to be determined for each specific implementation and in some particular circumstances may even vary with the time. For example, when the link between donor BTS and a repeater is through a leased cable, the mobile network operator does not necessarily know what are the delay and attenuation characteristics affecting the connection between donor BTS and repeater. In these cases alternative ways to determine unknown parameters must be devised.

One possibility according to embodiments of the present invention is to install test MS's in known locations and use them as reference receivers to determine unknown design parameters. These handsets may be normally in idle mode when they perform neighbour measurements and periodically may be set in dedicated mode. The RXLEV and TA measurements collected from them can be used to determine unknown parameters such as cable delay and attenuation but also statistical information on the random fluctuations affecting pathloss and propagation delay.

Embodiments of the present invention provide the advantage that they can be easily extended to those cases where a chain of repeaters is connected to one single donor BTS.

The invention claimed is:

1. A method for determining a location of a device communicating with a communication system, the method comprising:

collecting a plurality of values of a first signal characteristic, the first signal characteristic associated with a propagation delay of a signal received at a first device from a base station;

calculating a sample mean value based on the collected plurality of values;

calculating an expected mean value of the first signal characteristic;

calculating a test statistic based on the calculated sample mean value and the calculated expected mean value;

applying the calculated test statistic to a hypothesis test decision rule; and determining whether or not the signal received at the first device is received directly from the base station or is received from a second device based on application of the calculated test statistic to enable an accurate determination of a beat on of the first device.

2. The method of claim 1, further comprising calculating a sample standard deviation value based on the collected plurality of values wherein the test statistic is further based on the calculated sample standard deviation value.

3. The method of claim 2, wherein calculating the sample standard deviation value is performed only if a number of the collected plurality of values exceeds a pre-determined threshold.

4. The method of claim 2, wherein calculating the sample standard deviation value is performed only if an expected standard deviation value of the first signal characteristic is not known.

5. The method of claim 1, farther comprising calculating an expected standard deviation value of the first signal characteristic wherein the test statistic is further based on the calculated expected standard deviation value.

6. the method of claim 1, further comprising:
determining a first threshold, the first threshold defining a propagation delay indicating the signal is received directly from the base station;
if the calculated sample mean value is less than the determined first threshold, determining that the signal received at the first device is received directly from the base station.

7. The method of claim 1, further comprising:
determining a first threshold, the first threshold defining a propagation delay indicating the signal is not received directly from the base station;
if the calculated sample mean value is greater than the determined first threshold, determining that the signal received at the first device is received from the second device.

8. The method of claim 1, wherein the test statistic has a Gaussian distribution or a t-student distribution.

9. The method of claim 1, wherein a null hypothesis of the hypothesis test decision rule determines if the signal received at the first device is received directly from the base station, 10. The method of claim 1, wherein a null hypothesis of the hypothesis test decision rule determines if the signal received at the first device is received from the second device.

11. The method of claim 1, wherein the calculated expected mean value is based on a first delay associated with the second device and a second delay associated with an attenuation of the signal received.

12. A method for determining a location of a device communicating with a communication system, the method comprising:
collecting a plurality of values of a first signal characteristic, the first signal characteristic associated with a measured power of a signal received at a first device from a base station;
calculating sample mean value based on the collected plurality of values;
calculating an expected mean value of th first signal characteristic;
calculating a test statistic based on the calculated sample mean value and the calculated expected mean value;
applying the calculated test statistic to a hypothesis test decision rule; and
determining whether or not the signal received at the first device is received directly from the base station or is received from a second device based on application of the calculated test statistic to enable an accurate determination of a location of the first device.

13. The method of claim 12, further comprising calculating a sample standard deviation value based on the collected plurality of values wherein the test statistic is further based on the calculated sample standard deviation value.

14. The method of claim 13, wherein calculating the sample standard deviation value is performed only if a number of the collected plurality of values exceeds a pre-determined threshold.

15. The method of claim 13, wherein calculating the sample standard deviation value is performed only if an expected standard deviation value of the first signal characteristic is not known.

16. The method of claim 12, further comprising calculating an expected standard deviation value of the first signal characteristic wherein the test statistic is further based on the calculated expected standard deviation value.

17. The method of claim 12, further comprising:
determining a first threshold, the first threshold defining a propagation delay indicating the signal is received directly from the base station;
if the calculated sample mean value is less than the determined first threshold, determining that the signal received at the first device is received directly from the base station.

18. The method of claim 12, further comprising:
determining a first threshold, the first threshold defining a propagation delay indicating the signal is not received directly from the base station;
if the calculated sample mean value is greater than the determined first threshold, determining that the signal received at the first device is received from the second device.

19. The method of claim 12, wherein null hypothesis of the hypothesis test decision rule determines it the signal received at the first device is received directly from the base station.

20. The method of claim 12, wherein a null hypothesis of the hypothesis test decision rule determines if the signal received at the first device is received from the second device.

* * * * *